United States Patent [19]

Hayes

[11] Patent Number: 4,932,983
[45] Date of Patent: Jun. 12, 1990

[54] COPOLYIMIDE GAS SEPARATION MEMBRANES DERIVED FROM SUBSTITUTED METHYLENE DIANILINES AND UNSUBSTITUTED DIAMINES

[75] Inventor: Richard A. Hayes, Parkersburg, W. Va.

[73] Assignee: E. I. Du Pont de Nemours and Company, Wilmington, Del.

[21] Appl. No.: 360,043

[22] Filed: Jun. 1, 1989

[51] Int. Cl.$^5$ .............................................. B01D 53/22
[52] U.S. Cl. ............................................ 55/16; 55/68; 55/158
[58] Field of Search ........................... 55/16, 68, 158; 210/500.38, 500.39; 528/310, 329.1

[56] References Cited

U.S. PATENT DOCUMENTS

| | | | |
|---|---|---|---|
| Re. 30,351 | 7/1980 | Hoehn et al. | 55/16 |
| 3,822,202 | 7/1974 | Hoehn | 55/16 X |
| 3,899,309 | 8/1975 | Hoehn et al. | 55/16 |
| 4,156,597 | 5/1979 | Browall | 55/16 |
| 4,378,400 | 3/1983 | Makino et al. | 55/16 X |
| 4,528,004 | 7/1985 | Makino et al. | 55/158 |
| 4,690,873 | 9/1987 | Makino et al. | 55/16 X |
| 4,705,540 | 11/1987 | Hayes | 55/16 |
| 4,717,393 | 1/1988 | Hayes | 55/16 |
| 4,717,394 | 1/1988 | Hayes | 55/16 |
| 4,830,640 | 5/1989 | Nakamura et al. | 55/16 X |
| 4,832,713 | 5/1989 | Yamada et al. | 55/158 |
| 4,838,900 | 6/1989 | Hayes | 55/16 |

FOREIGN PATENT DOCUMENTS

| | | | |
|---|---|---|---|
| 60-022902 | 2/1985 | Japan | 55/158 |
| 60-082103 | 5/1985 | Japan | 55/158 |
| 61-133117 | 6/1986 | Japan | 55/158 |
| 62-074410 | 4/1987 | Japan | 55/158 |
| 62-0744114 | 4/1987 | Japan | 55/158 |
| 62-114628 | 5/1987 | Japan | 55/158 |
| 63-028424 | 2/1988 | Japan | 55/158 |
| 63-166415 | 7/1988 | Japan | 55/158 |
| 2098994 | 12/1982 | United Kingdom | 55/16 |

Primary Examiner—Robert Spitzer

[57] ABSTRACT

Semiflexible aromatic polyimides for preparing gas separation membranes and the process of using to separate at least one gas from a mixture of gases is disclosed. The aromatic polyimides are prepared by polycondensation of aromatic tetracarboxylic dianhydrides with 20 to 80 mol percent of a methylene dianiline which is alkyl substituted on all positions ortho to the amine functions. The remaining diamine constituent is not so substituted.

20 Claims, No Drawings

COPOLYIMIDE GAS SEPARATION MEMBRANES DERIVED FROM SUBSTITUTED METHYLENE DIANILINES AND UNSUBSTITUTED DIAMINES

BACKGROUND OF THE INVENTION

1. Field of the Invention

The present invention relates to gas separation membranes prepared by reacting aromatic tetracarboxylic dianhydrides with from 20 to 80 mol % of methylene dianilines having alkyl substituents on all positions ortho to the amine functions and 20 to 80 mol % aromatic diamines which are unsubstituted.

2. Prior Art

U.S. Pat. No. 4,838,900 discloses gas separation membranes formed from alkyl substituted methylene bisanilines and aromatic dianhydrides.

U.S. Pat. No. 4,705,540 discloses rigid polyimide gas separation membrane materials prepared from alkyl-substituted phenylene diamines and structurally rigid aromatic tetracarboxylic dianhydrides. Membranes prepared from these materials have exceptionally high gas permeation rates with moderate gas selectivities.

U.S. Pat. No. 4,717,394 discloses that a greater range of gas separation membrane productivities could be achieved through the controlled addition of less chain rigidity in the polyimide forming the membrane than that found for U.S. Pat. No. 4,705,540.

U.S. Pat. Re. No. 30,351; U.S. Pat. No. 3,822,202 and U.S. Pat. No. 3,899,309 disclose gas separation membranes comprising certain semi-rigid aromatic polyimides, polyamides and polyesters.

SUMMARY OF THE INVENTION

Semi-flexible aromatic polyimides, prepared by polycondensation of aromatic tetracarboxylic dianhydrides with mixtures of diamines, 20 to 80 mol percent of which are methylene dianilines having alkyl substituents on all positions ortho to the amine functions, are disclosed. Membranes formed from this class of polyimides have improved environmental stability and superior gas permeability. The range of gas permeation properties observed allows for the tailoring of membrane material for widely diverse gas separations. The high permeabilities of some gases from multicomponent mixtures is due to the optimization of the molecular free volume in the polymer.

DETAILED DESCRIPTION

The present invention relates to the discovery that aromatic polyimides derived from mixtures of diamines, 20 to 80 mol percent of which are methylene dianilines having substituents on all positions ortho to the amine functions, exhibit exceptional gas permeability. The selectivity of one gas over other gases in a multicomponent gas mixtures can be controlled through the choice of the amounts of aromatic diamines having substituents on all positions ortho to the amine functions while maintaining exceptional gas permeability. The high permeability of these membranes is believed to be due to the high molecular free volume in the polymer structure resulting from the rigid nature of the rotationally hindered polymer chains.

Generally, extremely high gas permeation through dense polymeric membranes is found only with low glass transition temperature (Tg) materials, such as silicone rubbers and a few polyolefin polymers. The low Tg materials are generally only useful as the dense separating layer in composite membranes, where a supporting porous membrane substructure provides structural integrity.

High Tg polymeric materials, found in the prior art, which may possess high gas selectivities, suffer from low gas permeabilities. Examples reported involve mostly unsubstituted, or partially substituted, polymers subject to forming a close chain packing during fabrication and/or subsequent operation.

The present invention circumvents the above shortcomings and provides exceptionally high permeability dense membranes using high Tg aromatic polyimides consisting essentially of repeating units of the formula:

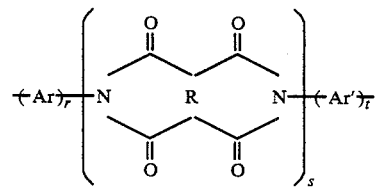

where —Ar— is

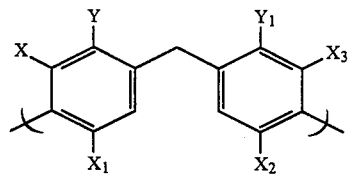

or mixtures thereof, —Ar'— is

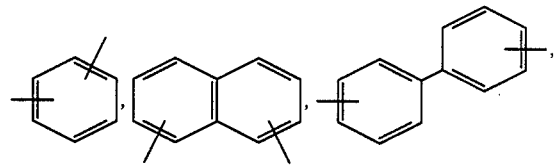

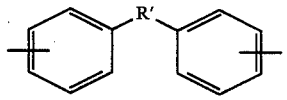

or mixtures thereof,

is

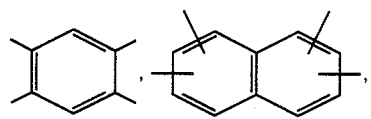

-continued

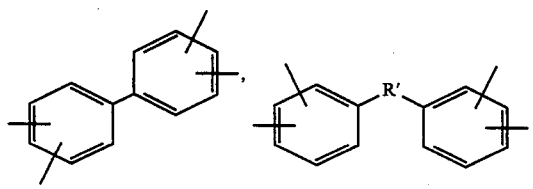

or mixtures thereof, —X, —X₁, —X₂, and —X₃ are independently primary or secondary alkyl groups having 1 to 6 carbon atoms preferably methyl, ethyl, or isopropyl, —Y and —Y₁ are independently —H, —X, —X₁, —X₂, or —X₃, and —R'— is

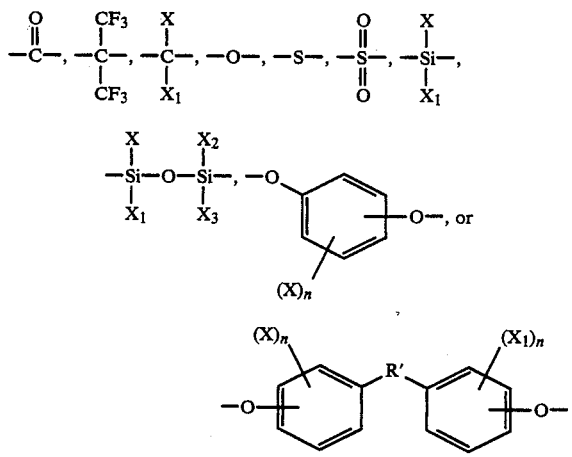

where n=0 to 4 alkylene radicals of 1 to 3 carbon atoms, or mixtures thereof r=20 to 80 mol %
t=20 to 80 mol %
t=100 mol % minus r
s=100 mol %.

The multiple substitutions ortho to the amines in the above illustrated structures sterically restricts free rotation around the imide linkage. These amines in combination with structurally rigid dianhydrides form relatively rigid polyimides. The incorporation of flexible units such as less rigid dianhydrides and/or —Ar'— for diamines allows for the partial relaxation of this rigidity which may lead to lowered molecular free volume in the polymer. This relaxation promotes greater selectivity for the permeation of certain gases from multicomponent gas mixtures through the membrane. At comparable gas selectivities, membranes of the polyimides disclosed herein have generally higher gas permeation rates than other polymers disclosed in the prior art. By varying the amount of relaxation in the polymers of this invention, membranes can be tailored for a wide range of gas separations with exceptional gas productivity.

Generally, prior art polyimide gas separation membrane materials suffer from low gas permeation rates, which is not desirable. It is believed that the low to moderate gas permeation rates found in the prior art is a direct consequence of the less rigid nature of the polyimide materials found therein. The lowered rigidity incorporated in such materials allows for closer packing of the polyimide chains and, in turn, lowers the molecular free volume. For example, polyimide membrane materials of the present invention have from 210 to 9 times the oxygen permeation rate found for polyimide membrane materials disclosed in U.S. Pat. No. 4,378,400. Similarly, the polyimide membrane materials of the present invention have from 11 to 2 times the oxygen permeation rate found for the polyetherimide membrane materials disclosed in U.S. Pat. No. 4,156,597.

The polyimide gas separation materials generally have greater gas permeation rates than found in the prior art. For example, at essentially the same oxygen/nitrogen gas selectivity, the polyimide materials of the present invention (Example 2) have more than 5 times the oxygen gas permeation rate than found for the before mentioned polyetherimide materials disclosed in U.S. Pat. No. 4,156,597. The polyimide gas separation materials taught in U.S. Pat. Re. No. 30,351, U.S. Pat. No. 3,822,202, and U.S. Pat. No. 3,899,309 also suffer from moderate gas permeation rates and selectivities. This is demonstrated by the herein incorporated Comparative Example below, which is typical of the polyimide membrane materials disclosed therein. The polyimide gas separation materials of the present invention can be tailored over a wide range of gas separations with greater gas permeation rates than found in the prior art.

As preferred examples, some of the fully cyclized polyimides of this invention are soluble in ordinary organic solvents. This is a great advantage for the ease of fabrication of industrially useful membranes. Further, the polyimides reported in this invention range from extremely soluble to insoluble. The soluble polyimides can be solution cast on porous solvent resistant substrates to serve as the dense separating layer of a composite membrane; or they can be solution cast as dense or asymmetric membranes. Insoluble examples can be cast into membranes from their polyamic acid form and subsequently chemically or thermally cyclized.

The polyimides described in this invention have high inherent thermal stabilities. They are generally stable to 400° C. in air or inert atmospheres. The glass transition temperatures of these polyimides are generally above 300° C. The high temperature characteristics of these polyimides can help to prevent the membrane compaction problems observed in other polymers at even moderate temperatures.

The polyimide membranes disclosed herein have found use in gas separations. The present invention finds use in the enrichment of oxygen and nitrogen from air for increased combustion or inerting systems, respectively; in recovery of hydrogen in refinery and ammonia plants; separation of carbon dioxide or hydrogen sulfide from hydrocarbons.

EXAMPLES

EXAMPLE 1

To a stirred solution of
4,4'-methylene-bis(2,6-diisopropyl)aniline (18.33 g, 0.05 mol) and
4,4'-(methylethylidene)bisaniline (11.3 g, 0.05 mol)
in N-methylpyrrolidone (300 ml) was added 3,3',4,4'-benzophenonetetracarboxylic dianhydride (32.87 g, 0.102 mol) under an inert atmosphere at room temperature. The reaction solution was allowed to stir overnight at room temperature and then a solution of acetic anhydride (40.84 g, 0.40 mol) and triethylamine (40.48 g, 0.40 mol) was added with rapid stirring. After stirring at room temperature for 3 hours, the reaction solution was precipitated in water. The resulting solid was collected and washed twice with water, washed twice with methanol and allowed to air dry overnight. The solid was further dried in a vacuum oven at 20 inches (0.51 m) mercury and 120° C. for 4 hours and at 240° C. for 3 hours to yield 56.8 g product.

Films of the polymer prepared above were cast from a 15% polymer solution (based on weight) in N-methylpyrrolidone onto a glass plate treated with Du Pont TEFLON ® dry lubricant at 100° C.±2° C. with a 15 mil ($38.4 \times 10^{-5}$ m) knife gap. After drying on the plate at 100° C.±2° C. for 0.5 hour, the films were further dried in a vacuum oven at 20 inches (0.51 m) mercury and room temperature overnight. The films were stripped off the plate and dried in a vacuum oven at 20 inches (0.51 m) mercury and room temperature overnight. The films were stripped off the plate and dried in a vacuum oven at 20 inches (0.51 m) mercury and 120° C. for 4 hours. The films were tough and flexible and could be creased without cracking.

Du Pont TEFLON ® dry lubricant contains a fluorocarbon telomer which reduces the adhesion of the membrane to the glass plate.

A film, prepared as above which was 1.31 mils ($3.3 \times 10^{-5}$ m) thick, was tested for mixed gas oxygen/nitrogen (21/79, mole) permeabilities at 100.8 psig (695 kPa), 23.9° C. The results are reported below:

$O_2$ Productivity: 840 centiBarrers
$O_2/N_2$ Selectivity: 5.6

A centiBarrer is the number of cubic centimeters of gas passed by the membrane at standard temperature and pressure times the thickness of the membrane in centimeters times $10^{-12}$ divided by the permeating area of the membrane in square centimeters times the time in seconds times the partial pressure difference across the membrane in cm Hg, i.e., $$\text{centiBarrer} = 10^{-12} \frac{\text{cm}^3 \text{ (STP) cm}}{\text{cm}^2 \text{ sec cmHg}}$$

A film, prepared as above which was 1.43 mils ($3.6 \times 10^{-5}$ m) thick, was tested for pure gas nitrogen, helium and carbon dioxide permeabilities at 500 psig (3447 kPa), 200 psig (1379 kPa), and 200 psig (1379 kPa), respectively, 24° C.±1°. The results are reported below:

He Productivity: 1700 centiBarrers
He/$N_2$ Selectivity: 27
$CO_2$ Productivity: 3030 centiBarrers
$CO_2/N_2$: Selectivity: 49.

COMPARATIVE EXAMPLE

To a stirred solution of 1,5-naphthalene diamine (31.6 g, 0.2 mol) in N,N'-dimethylacetamide (400 ml) was portionwise added under an inert atmosphere at room temperature
5,5'-[2,2,2-trifluoro-1(trifluoromethyl)ethylidene]-bis-1,3-isobenzofurandione (88.9 g, 0.2 mol):

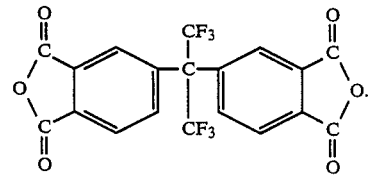

The reaction solution was heated to 67° C. and stirred for 1 hour. A solution of acetic anhydride (82 g) and triethylamine (82 g) was added to the rapidly stirring reaction solution. After stirring 2 hours at room temperature, the viscous reaction solution was precipitated in methanol. The resulting off-white solid was collected and dried in a vacuum oven at 20 inches (0.51 m) mercury for 1 hour at 150° C. and for 4 hours at 220° C.

Films of the above polyimide were cast from a 15% polymer solution (based on weight) in N-methylpyrrolidone onto a glass plate treated with Du Pont TEFLON ® dry lubricant at 60° C. with a 15 mil ($38 \times 10^{-5}$ m) knife gap. The films were dried on the plate at 60° C., cooled to room temperature and stripped off the plate. The films were further dried in a vacuum oven at 20 inches (0.51 m) mercury and room temperature overnight, at 110° C. for 3 hours and at 220° C. for 4 hours.

The films prepared above were tested for mixed gas $O_2/N_2$ (21/79, mole) permeabilities at 300 psig ($20.7 \times 10^5$ Pa), 25° C. The results are reported below:

$O_2$ Productivity: 560 centiBarrers
$O_2/N_2$ Selectivity: 4.8.

EXAMPLE 2

To a stirred solution of 1,3-phenylene diamine (12.98 g, 0.12 mol),
4,4'-methylene-bis(2-ethyl-6-methyl)aniline (11.28 g, 0.04 mol) and 4,4'methylene-bis(2,6-diethyl)aniline (12.40 g, 0.04 mol) in N-methylpyrrolidone (500 ml) was added
5,5'-[2,2,2-trifluoro-2-(trifluoromethyl)ethylidene]-bis-1,3-isobenzofurandione (71.75 g, 0.162 mol) and
1,2,4,5-benzenetetracarboxylic dianhydride (8.81 g, 0.04 mol)
under an inert atmosphere at room temperature. The resulting viscous solution was stirred overnight at room temperature. A solution of acetic anhydride (81.68 g, 0.80 mol) and triethylamine (80.96 g, 0.80 mol) was then added with rapid stirring at room temperature. The resulting reaction solution was stirred at room temperature for 2.5 hours and was then precipitated in water. The resulting solid was collected and washed twice with water, washed twice with methanol, and allowed to air dry overnight. The solid was further dried in a vacuum oven at 20 inches (0.51 m) mercury and 120° C. for 4 hours and at 245° C. for 4 hours to yield 108.9 g product.

Films of the polymer prepared above were cast from a 15% polymer solution (based on weight) in N-methylpyrrolidone onto a glass plate treated with Du Pont TEFLON ® dry lubricant at 100° C.±2° C. with a 20 mil ($5.1 \times 10^{-4}$ m) knife gap. After drying on the plate at 100° C.±2° C. for 0.5 hour, the films were further dried in a vacuum oven at 20 inches (0.51 m) mercury and room temperature overnight. The films were stripped off the plate and dried in a vacuum oven at 20 inches (0.51 m) mercury and 120° C. for 4 hours. The films were tough and flexible and could be creased without cracking.

A film, prepared as above which was 1.75 mils (4.4×10⁻⁵ m) thick, was tested for mixed gas oxygen/nitrogen (21/79, mole) permeabilities at 95.1 psig (650 kPa), 23.6° C. The results are reported below:

O₂ Productivity: 975 centiBarrers
O₂/N₂ Selectivity: 5.3.

EXAMPLE 3

To a stirred solution of
4,4'-methylene-bis(2,6-diisopropyl aniline) (55.0 g, 0.15 mol) and
4,4'-[1,4-phenylenebis(1-methylethylidene)]-bis-aniline (17.2 g, 0.05 mol) in N-methylpyrrolidone (400 ml) was added 3,3',4,4'-benzophenonetetracarboxylic dianhydride (65.1 g, 0.202 mol) under an inert atmosphere at room temperature. The dark, viscous solution was stirred overnight at room temperature. A solution of acetic anhydride (75.5 ml, 0.80 mol) and triethylamine (111.5 ml, 0.8 mol) was added with rapid stirring at room temperature. After stirring for 7 hours at room temperature, the viscous, orange reaction solution was precipitated in water. The resulting solid was washed three times with water and two times with methanol. The polymer was air-dried overnight and then dried in a vacuum oven at 20 inches (0.51 m) mercury and 120° C. for 4 hours and at 250° C. for 4 hours to yield 134.8 g product.

4,4'-[1,4-phenylenebis(1-methylethylidene)]bisaniline has the structural formula:

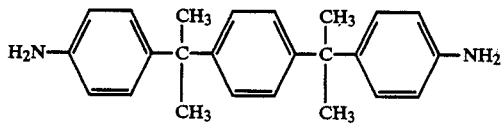

Films of the polymer prepared above were cast from a 15% polymer solution (based on weight) in N-methylpyrrolidone onto a glass plate treated with Du Pont TEFLON ® dry lubricant at 100° C.±2° C. with a 15 mil (38.4×10⁻⁵ m) knife gap. After drying on the plate at 100° C.±2° C. for 0.5 hour, the films were further dried in a vacuum oven at 20 inches (0.51 m) mercury and room temperature overnight. The films were stripped off the plate and dried in a vacuum oven at 20 inches (0.51 m) mercury) and 120° C. for 4 hours. The films were tough and flexible and could be creased without cracking.

A film, prepared as above which was 1.8 mils (4.6×10⁻⁵ m) thick, was tested for mixed gas oxygen/nitrogen (21/79, mole) permeabilities at 98.1 psig (676 kPa), 23.4° C. The results are reported below:

O₂ Productivity: 990 centiBarrers
O₂/N₂ Selectivity: 5.2.

EXAMPLE 4

To a stirred solution of
4,4'-methylene-bis(2,6-diisopropyl aniline) (36.7 g, 0.10 mol) and
4,4'-[1,4-phenylenebis(1-methylethylidene)]bisaniline (34.4 g, 0.10 mol)
in N-methylpyrrolidone (400 ml) was added 3,3',4,4'-benzophenonetetracarboxylic dianhydride (65.1 g, 0.202 mol) under an inert atmosphere at room temperature. The dark, viscous solution was stirred overnight at room temperature. A solution of acetic anhydride (75.5 ml, 0.80 mol) and triethylamine (111.5 ml, 0.80 mol) was added with rapid stirring at room temperature. After stirring for 7 hours at room temperature, the viscous, yellow-orange reaction solution was precipitated in water. The resulting solid was washed three times with water and two times with methanol. The polymer was air-dried overnight and then dried in a vacuum oven at 20 inches (0.51 m) mercury and 120° C. for 4 hours and at 250° C. for 4 hours to yield 130.2 g product.

Films of the polymer prepared above were cast from a 15% polymer solution (based on weight) in N-methylpyrrolidone onto a glass plate treated with Du Pont TEFLON ® dry lubricant at 100° C.±2° C. with a 15 mil (38.4×10 m) knife gap. After drying on the plate at 100° C.±2° C. for 0.5 hour, the films were further dried in a vacuum oven at 20 inches (0.51 m) mercury and room temperature overnight. The films were stripped off the plate and dried in a vacuum oven at 20 inches (0.51 m) mercury) and 120° C. for 4 hours. The films were tough and flexible and could be creased without cracking.

A film, prepared as above which was 1.7 mils (4.3×10⁻⁵ m) thick, was tested for mixed gas oxygen/nitrogen (21/79, mole) permeabilities at 99.1 psig (683 kPa), 24.5° C. The results are reported below:

O₂ Productivity: 590 centiBarrers
O₂/N₂ Selectivity: 5.5.

EXAMPLE 5

To a stirred solution of
4,4'-methylene-bis(2,6-diisopropyl aniline) (55.0 g, 0.15 mol) and
1,4-bis(4-aminophenoxy)biphenyl (18.64 g, 0.05 mol)
in N-methylpyrrolidone (400 ml) was added 5,5'[2,2,2-trifluoro-2-(trifluoromethyl)ethylidene]-1,3-isobenzofurandione (89.69 g, 0.202 mol) under an inert atmosphere at room temperature. The dark, viscous solution was stirred overnight at room temperature. A solution of acetic anhydride (81.67 ml, 0.80 mol) and triethylamine (80.95 ml, 0.80 mol) in N-methylpyrrolidone (150 ml) was added with rapid stirring at room temperature. After stirring for 2 hours at room temperature, the reaction solution was precipitated in water. The resulting solid was collected and washed twice with water, washed twice with methanol, and allowed to air dry. The solid was further dried in a vacuum oven at 20 inches (0.51 m) mercury and 120° C. for 5 hours and at 240° C. for 3 hours to yield 154.3 g product.

The polymer prepared above was found to be soluble in toluene, acetone, dichloromethane, m-cresol, N,N-dimethylacetamide, and N-methylpyrrolidone.

Films of the polymer prepared above were cast from a 15% polymer solution (based on weight) in N-methylpyrrolidone onto a glass plate treated with Du Pont TEFLON ® dry lubricant at 100° C.±2° C. with a 15 mil (38.4×10⁻⁵ m) knife gap. After drying on the plate at 100° C.±2° C. for 0.5 hour, the films were further dried in a vacuum oven at 20 inches (0.51 m) mercury and room temperature overnight. The films were stripped off the plate and dried in a vacuum oven at 20 inches (0.51 m) mercury and 120° C. for 4 hours. The films were tough and flexible and could be creased without cracking.

A film, prepared as above which was 1.25 mils (3.2×10⁻⁵ m) thick, was tested for mixed gas oxygen/nitrogen (21/79, mole) permeabilities at 487.6 psig (3362 kPa), 23.6° C. The results are reported below:

O₂ Productivity: 2020 centiBarrers
O₂/N₂ Selectivity: 4.4.

EXAMPLE 6

To a stirred solution of
4,4'-methylene-bis(2,6-diisopropyl aniline) (36.7 g, 0.10 mol) and
1,4-bis(4-aminophenoxy)biphenyl (37.3 g, 0.10 mol) in N-methylpyrrolidone (400 ml) was added 5,5'[2,2,2-trifluoro-2-(trifluoromethyl)ethylidene]-1,3-isobenzofurandione (89.69 g, 0.202 mol) under an inert atmosphere at room temperature. The dark, viscous solution was stirred overnight at room temperature. A solution of acetic anhydride (81.67 ml, 0.80 mol) and triethylamine (80.95 ml, 0.80 mol) in N-methylpyrrolidone (200 ml) was added with rapid stirring at room temperature. After stirring for 2 hours at room temperature, the reaction solution was precipitated in water. The resulting solid was collected and washed twice with water, washed twice with methanol, and allowed to air dry. The solid was further dried in a vacuum oven at 20 inches (0.51 m) mercury and 120° C. for 5 hours to yield 154.15 g product.

The polymer prepared above was found to be soluble in toluene, acetone, dichloromethane, m-cresol, N,N-dimethylacetamide, and N-methylpyrrolidone.

Films of the polymer prepared above were cast from a 15% polymer solution (based on weight) in N-methylpyrrolidone onto a glass plate treated with Du Pont TEFLON® dry lubricant at 100° C.±2° C. with a 15 mil (38.4×10⁻⁵ m) knife gap. After drying on the plate at 100° C.±2° C. for 0.5 hour, the films were further dried in a vacuum oven at 20 inches (0.51 m) mercury and room temperature overnight. The films were stripped off the plate and dried in a vacuum oven at 20 inches (0.51 m) mercury and 120° C. for 4 hours. The films were tough and flexible and could be creased without cracking.

A film, prepared as above which was 1.25 mils (3.2×10⁻⁵ m) thick, was tested for mixed gas oxygen/nitrogen (21/79, mole) permeabilities at 491.4 psig (3388 kPa), 23.0° C. The results are reported below:

O₂ Productivity: 760 centiBarrers
O₂/N₂ Selectivity: 4.7.

EXAMPLE 7

To a stirred solution of
4,4'-methylene-bis(2-methyl-6-isopropyl aniline) (46.5 g, 0.15 mol) and
1,4-bis(4-aminophenoxy)biphenyl (18.64 g, 0.05 mol) in N-methylpyrrolidone (400 ml) was added 5,5'[2,2,2-trifluoro-2(trifluoromethyl)ethylidene]-1,3-isobenzofurandione (89.69 g, 0.202 mol) under an inert atmosphere at room temperature. The dark, viscous solution was stirred overnight at room temperature. A solution of acetic anhydride (81.67 ml, 0.80 mol) and triethylamine (80.95 ml, 0.80 mol) in N-methylpyrrolidone (150 ml) was added with rapid stirring at room temperature. After stirring for 2 hours at room temperature, the reaction solution was precipitated in water. The resulting solid was collected and washed three times with water, washed twice with methanol, and air dried overnight. The solid was further dried in a vacuum oven at 20 inches (0.51 m) mercury and 120° C. for 5 hours and at 240° C. for 3 hours to yield 144.4 g product.

The polymer prepared above was found to be soluble in toluene, acetone, dichloromethane, m-cresol, N,N-dimethylacetamide, and N-methylpyrrolidone.

Films of the polymer prepared above were cast from a 15% polymer solution (based on weight) in N-methylpyrrolidone onto a glass plate treated with Du Pont TEFLON® dry lubricant at 100° C.±2° C. with a 15 mil (38.4×10⁻⁵ m) knife gap. After drying on the plate at 100° C.±2° C. for 0.5 hour, the films were further dried in a vacuum oven at 20 inches (0.51 m) mercury and room temperature overnight. The films were stripped off the plate and dried in a vacuum oven at 20 inches (0.51 m) mercury and 120° C. for 4 hours. The films were tough and flexible and could be creased without cracking.

A film, prepared as above which was 1.25 mils (3.2×10⁻⁵ m) thick, was tested for mixed gas oxygen/nitrogen (21/79, mole) permeabilities at 487.9 psig (3364 kPa), 23.0° C. The results are reported below:

O₂ Productivity: 1120 centiBarrers
O₂/N₂ Selectivity: 4.4.

EXAMPLE 8

To a stirred solution of
4,4'-methylene-bis(2-methyl-6-isopropyl aniline) (31.0 g, 0.10 mol) and
1,4-bis(4-aminophenoxy)biphenyl (37.3 g, 0.10 mol) in N-methylpyrrolidone (400 ml) was added 5,5'[2,2,2-trifluoro-2(trifluoromethyl)ethylidene]-1,3-isobenzofurandione (89.69 g, 0.202 mol) under an inert atmosphere at room temperature. The very viscous dark brown solution was stirred overnight at room temperature. A solution of acetic anhydride (81.67 ml, 0.80 mol) and triethylamine (80.95 ml, 0.80 mol) in N-methylpyrrolidone (200 ml) was added with rapid stirring at room temperature. After stirring for 2 hours at room temperature, the reaction solution was diluted with additional N-methylpyrrolidone and precipitated in water. The resulting solid was collected and washed twice with water, washed twice with methanol, and allowed to air dry overnight. The solid was further dried in a vacuum oven at 20 inches (0.51 m) mercury and 120° C. for 5 hours to yield 143.6 g product.

The polymer prepared above was found to be soluble in toluene, acetone, dichloromethane, m-cresol, dimethyl sulfoxide, N,N-dimethylacetamide, and N-methylpyrrolidone.

Films of the polymer prepared above were cast from a 15% polymer solution (based on weight) in N-methylpyrrolidone onto a glass plate treated with Du Pont TEFLON® dry lubricant at 100° C.±2° C. with a 15 mil (38.4×10⁻⁵ m) knife gap. After drying on the plate at 100° C.±2° C. for 0.5 hour, the films were further dried in a vacuum oven at 20 inches (0.51 m) mercury and room temperature overnight. The films were stripped off the plate and dried in a vacuum oven at 20 inches (0.51 m) mercury and 120° C. for 4 hours. The films were tough and flexible and could be creased without cracking.

A film, prepared as above which was 1.25 mils (3.2×10⁻⁵ m) thick, was tested for mixed gas oxygen/nitrogen (21/79, mole) permeabilities at 485.6 psig (3348 kPa), 25.1° C. The results are reported below:

O₂ Productivity: 490 centiBarrers
O₂/N₂ Selectivity: 4.6.

EXAMPLE 9

To a stirred solution of 4,4'-diaminophenyl ether (15.00 g, 0.075 mol) and 4,4'-methylene-bis(2,6-diethyl aniline) (23.25 g, 0.075 mol)
in N-methylpyrrolidone (350 ml) was added 5,5'[2,2,2-trifluoro-1-(trifluoromethyl)ethylidene]-bis-1,3-isobenzofurandione (67.27 g, 0.1515 mol) under an inert atmosphere at room temperature. The resulting viscous orange solution was stirred overnight at room temperature. A solution of acetic anhydride (61.25 ml, 0.60 mol) and triethylamine (60.71 ml, 0.60 mol) was added with rapid stirring at room temperature. After stirring for 3 hours, the solution was diluted with additional N-methylpyrrolidone and precipitated in water. The resulting solid was collected and washed twice with water, washed twice with methanol, and allowed to air dry. The solid was further dried in a vacuum oven at 20 inches (0.51 m) mercury and 100° C. for 15 hours and at 245° C. for 4 hours to yield 99.4 g product.

Films of the polymer prepared above were cast from a 15% polymer solution (based on weight) in N-methylpyrrolidone onto a glass plate treated with Du Pont TEFLON ® dry lubricant at 100° C.±2° C. with a 15 mil (38.4×10$^{-5}$ m) knife gap. After drying on the plate at 100° C.±2° C. for 0.5 hour, the films were further dried in a vacuum oven at 20 inches (0.51 m) mercury and room temperature overnight. The films were stripped off the plate and dried in a vacuum oven at 20 inches (0.51 m) mercury and 120° C. for 4 hours. The films were tough and flexible and could be creased without cracking.

A film, prepared as above which was 1.8 mils (4.6×10$^{-5}$ m) thick, was tested for mixed gas oxygen/nitrogen (21/79, mole) permeabilities at 98.6 psig (680 kPa), 25.1° C. The results are reported below:
$O_2$ Productivity: 1510 centiBarrers
$O_2/N_2$ Selectivity: 4.7.

EXAMPLE 10

To a stirred solution of 4,4'-methylene-bis(2,6-diisopropylaniline) (55.0 g, 0.15 mol) and 4,4'-[1,4-phenylene-bis(1-methylethylidene)]bisaniline (17.2 g, 0.05 mol) in N-methylpyrrolidone (400 ml) was added 3,3',4,4'-benzophenonetetracarboxylic acid dianhydride (52.07 g, 0.162 mol) and 1,2,4,5-benzenetetracarboxylic acid dianhydride (8.81 g, 0.0404 mol) under an inert atmosphere at room temperature. The resulting reaction solution was allowed to stir overnight at room temperature. To the resulting very viscous reaction solution was added a solution of acetic anhydride (81.67 g, 0.8 mol) and triethylamine (80.95 g, 0.80 mol) in N-methylpyrrolidone (200 ml) with rapid stirring at room temperature. The resulting reaction solution was stirred overnight at room temperature and then was precipitated in water. The resulting solid was collected, washed twice with water, washed twice with methanol and then allowed to air dry overnight. The solid was futher dried in a vacuum oven at 20 inches (0.51 m) mercury and 120° C. for 8 hours to yield 125.2 g product.

The polyimide prepared above was found to be soluble in toluene, methylene dichloride, dimethylsulfoxide, m-cresol, N,N-dimethylacetamide and N-methylpyrrolidone.

Films of the polymer prepared above were cast from a 15% polymer solution (based on weight) in N-methylpyrrolidone onto a glass plate treated with Du Pont TEFLON ® dry lubricant at 100° C.±2° C. with a 20-mil (5.1×10$^{-4}$ m) knife gap. After drying on the plate at 100° C.±2° C. for 0.5 hour, the films were further dried in a vacuum oven at 20 inches (0.51 m) mercury and room temperature overnight. The films were stripped off the plate and dried in a vacuum oven 20 inches (0.51 m) mercury and 120° C. for 4 hours. The films were tough and flexible and could be creased without cracking.

A film, prepared as above which was 2.25 mils (5.7×10$^{-5}$ m) thick, was tested for mixed gas oxygen/nitrogen (21/79, mole) permeabilities at 116.3 psig (800 kPa), 22.6° C. The results are reported below:
$O_2$ Productivity: 1230 centiBarrers
$O_2/N_2$ Selectivity: 5.04.

EXAMPLE 11

To a stirred solution of 4,4'-methylenebis(2,6-diisopropylaniline) (55.0 g, 0.15 mol) and 1,4-bis(aminophenoxy)biphenyl (18.64 g, 0.05 mol) in N-methylpyrrolidone (400 ml) was added 3,3',4,4'-benzophenonetetracarboxylic acid dianhydride (65.09 g, 0.202 mol) under an inert atmosphere at room temperature. The reaction solution was stirred overnight at room temperature. To the resulting extremely viscous reaction solution was added a solution of acetic anhydride (81.67 g, 0.80 mol) and triethylamine (80.95 g, 0.80 mol) in N-methylpyrrolidone (200 ml) under an inert atmosphere at room temperature. The resulting reaction solution was allowed to sit over the weekend at room temperature. The reaction solution was diluted with additional N-methylpyrrolidone and precipitated in water. The resulting solid was collected, washed twice with water, washed twice with methanol, and allowed to air dry overnight. The solid was further dried in a vacuum oven at 20 inches (0.51 m) mercury and 125° C. for 8 hours to yield 127.2 g product.

Films of the polymer prepared above were cast from a 15% polymer solution (based on weight) in N-methylpyrrolidone onto a glass plate treated with Du Pont TEFLON ® dry lubricant at 100° C.±2° C. with a 20-mil (5.1×10$^{-4}$ m) knife gap. After drying on the plate at 100° C.±2° C. for 0.5 hour, the films were further dried in a vacuum oven at 20 inches (0.51 m) mercury and room temperature overnight. The films were stripped off the plate and dried in a vacuum oven at 20 inches (0.51 m) mercury and 120° C. for 4 hours. The films were tough and flexible and could be creased without cracking.

A film, prepared as above which was 2.15 mils (5.5×10$^{-5}$ m) thick, was tested for mixed gas oxygen/nitrogen (21/79, mole) permeabilities at 116.2 psig (801 kPa), 23.1° C. The results are reported below:
$O_2$ Productivity: 515 centiBarrers
$O_2/N_2$ Selectivity: 5.0.

I claim:

1. A process for separating two or more gases from a mixture of gases comprising the steps of bringing such mixture of gases into contact with one side of a permselective membrane which is formed of an aromatic polyimide consisting essentially of repeating units of the formula:

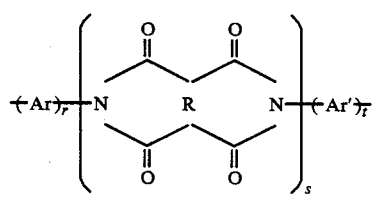

where —Ar— is

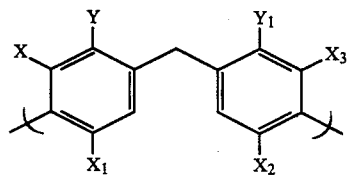

or mixtures thereof, —Ar'— is

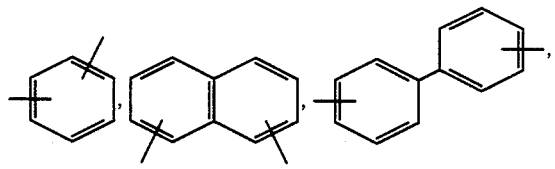

or mixtures thereof,

is

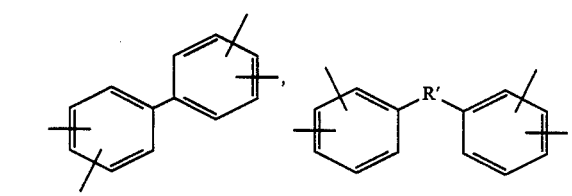

or mixtures thereof, —X, —X$_1$, —X$_2$, and —X$_3$ are independently primary or secondary alkyl groups having 1 to 6 carbon atoms, —Y and —Y$_1$ are independently —H, —X, —X$_1$, —X$_2$, or —X$_3$. and —R'— is

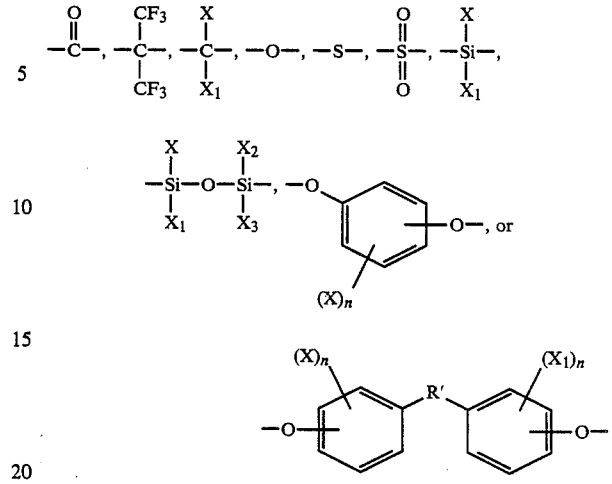

where n=0 to 4 alkylene radicals of 1 to 3 carbon atoms, or mixtures thereof r=20 to 80 mol % t=20 to 80 mol % t=100 mol % minus r s=100 mol %.

2. The process of claim 1 wherein

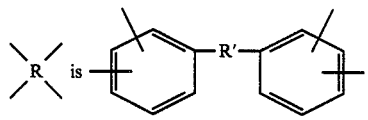

3. The process of claim 2 wherein —R'— is

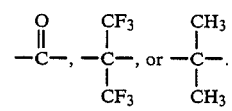

4. The process of claim 3 wherein —Ar'— is

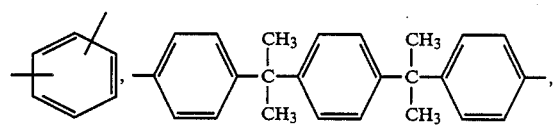

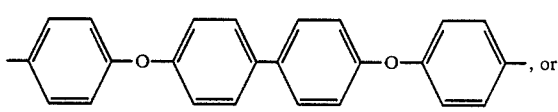

5. The process of claim 4 wherein —X, —X$_1$, —X$_2$ and —X$_3$ are —CH$_3$, —C$_2$H$_5$ or —CH(CH$_3$)$_2$.

6. The process of claim 5 wherein —Ar'— is

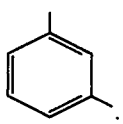

7. The process of claim 5 wherein —Ar'— is

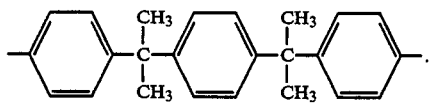

8. The process of claim 5 wherein —Ar'— is

9. The process of claim 5 wherein —Ar'— is

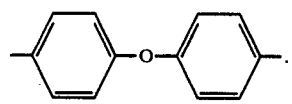

10. The process of claim 1 wherein said alkyl groups are selected from the group of methyl, ethyl, and isopropyl.

11. An aromatic polyimide gas separation membrane wherein the aromatic polyimide consists essentially of repeating units of the formula:

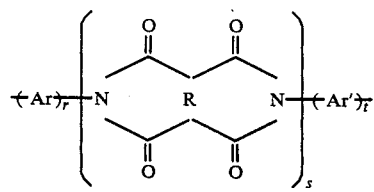

where —Ar— is

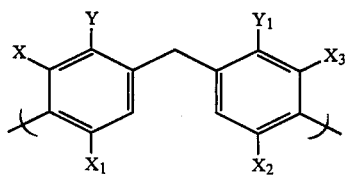

or mixtures thereof, —Ar'— is

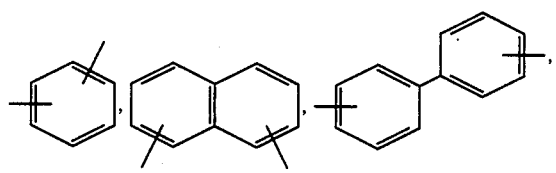

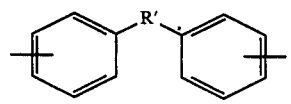

or mixtures thereof,

is

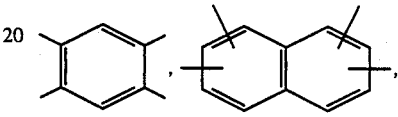

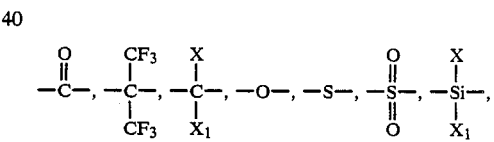

or mixtures thereof, —X, —$X_1$, —$X_2$, and —$X_3$ are independently primary or secondary alkyl groups having 1 to 6 carbon atoms, —Y and —$Y_1$ are independently —H, —X, —$X_1$, —$X_2$, or —$X_3$. and —R'— is

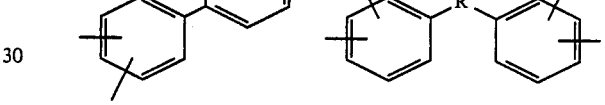

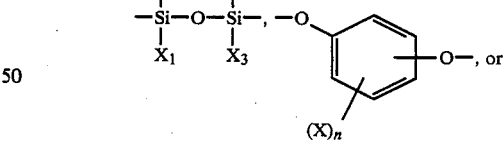

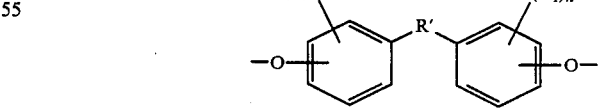

where n=0 to 4 alkylene radicals of 1 to 3 carbon atoms, or mixtures thereof r=20 to 80 mol % t=20 to 80 mol % t=100 mol % minus r s=100 mol %.

12. The membrane of claim 11 wherein

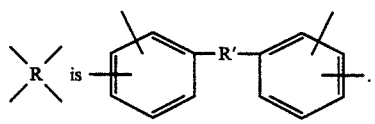 is 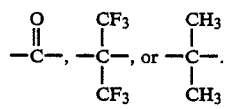

13. The membrane of claim 12 wherein —R′— is

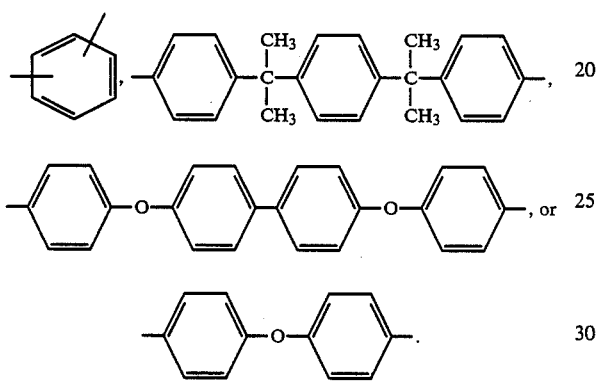

14. The membrane of claim 13 wherein —Ar′— is

15. The membrane of claim 14 wherein —X, —X₁, —X₂ and —X₃ are —CH₃, —C₂H₅ or —CH(CH₃)₂.

16. The membrane of claim 15 wherein —Ar′— is

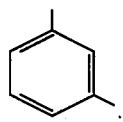

17. The membrane of claim 15 wherein —Ar′— is

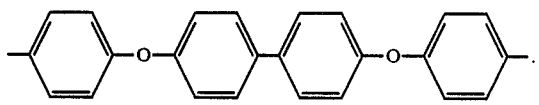

18. The membrane of claim 15 wherein —Ar′— is

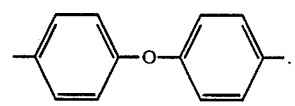

19. The membrane of claim 15 wherein —Ar′— is

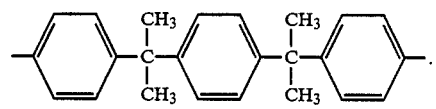

20. The membrane of claim 11 wherein said alkyl groups are selected from the group of methyl, ethyl, and isopropyl.

* * * * *